INVENTOR
William R. Wickerham.
BY
ATTORNEY

INVENTOR
William R. Wickerham.
BY
ATTORNEY

Jan. 31, 1961 W. R. WICKERHAM 2,970,251
ELECTRIC CONTROL FOR ALTERNATING-CURRENT MOTOR
Original Filed March 21, 1952 7 Sheets-Sheet 3

INVENTOR
William R. Wickerham.
BY
ATTORNEY

United States Patent Office 2,970,251
Patented Jan. 31, 1961

2,970,251

ELECTRIC CONTROL FOR ALTERNATING-CURRENT MOTOR

William R. Wickerham, Buffalo, N.Y., assignor to Westinghouse Electric Corporation, East Pittsburgh, Pa., a corporation of Pennsylvania Original application Mar. 21, 1952, Ser. No. 277,749, now Patent No. 2,774,923, dated Dec. 18, 1956. Divided and this application July 10, 1956, Ser. No. 596,944

4 Claims. (Cl. 318—207)

This application is a division of Patent 2,774,923, granted December 18, 1956 to William R. Wickerham.

The invention in this application relates to control systems for alternating-current induction motors to be used to operate cranes, mine hoists, and other hoisting and elevating devices.

An induction motor, provided with the usual simple reversing and rheostatic type of control, tends to run only at full speed and cannot hold back until forced to run at a speed above synchronous speed. Such operating characteristic is satisfactory when the motor is to operate to hoist a load because the load holds back and the motor pull can be regulated to obtain reduced speed. For the lowering operation of a load, conditions are, however, not good because both the load and the motor drive the load down until full speed is reached. Braking action takes place only after the motor exceeds full speed. Since such operation is highly undesirable, it is apparent that the problem is to attain effective speed control of the motor between zero speed and full speed during lowering of a load.

Several systems of control are known in the trade that aim to attain reduced speed during lowering but such prior art control systems are either expensive requiring either mechanical or electrical braking means in addition to the motor, or are not wholly reliable or both. When no auxiliary equipment as brakes is used, the control may so burden and unbalance the motor that motors of relatively high rating are needed for a given range of load requirements.

It is an object of my invention to provide a system of control for an induction motor operating hoisting equipment which control shall have highly sensitive response to command signals for producing changes in the operation of the motor.

Another broad object of my invention, for a load being lowered by an induction motor operating a hoist, is the provision of such sensitive control automatically responsive to a load being lowered.

It is an object of my invention to obtain with alternating-current motors in hoist applications a stabilized subsynchronous speed down to small fractions of the synchronous speed with the aid of control devices responsive with high sensitivity to selected speed settings and the load on the motor and which are disposed outside of the internal connections of the motor to thus permit the use of motors of standard design for this purpose.

Another object of my invention is to selectively effect the operation of an alternating-current motor either under multiphase torque conditions at a relatively high speed, or at a subsynchronous relatively low speed of operation, the speed in each case being dependent with high sensitivity on a speed selection made and the load on the motor.

A further object of my invention is to obtain a torque reversing control by providing a voltage unbalance responsive with high sensitivity to the motor load and the operation of a master controller.

Another broad object of my invention is the provision of a control for an induction motor whereby the phase balance of the motor may be varied from zero unbalance to considerably more than 100% unbalance, and where such variation of phase unbalance may, for any selected range of unbalance, when desired, be made in micrometric steps.

It is also an object of my invention to change the phase balance of an induction motor in sensitive response either to the load on the motor, or to the speed of the motor, or to the selected setting of adjustable control apparatus, or to a fixed bias unbalance, or any combination of any two or more of these functions.

An incidental object of this invention is to provide a novel control circuit for a polyphase induction motor which is particularly adapted for controlling such a motor connected to drive a hoist.

The objects expressed are merely illustrative. Other objects and advantages, as well as the means provided by my invention for achieving them, will become more apparent from a study of the following specification and the accompanying drawings, in which.

Figure 4:
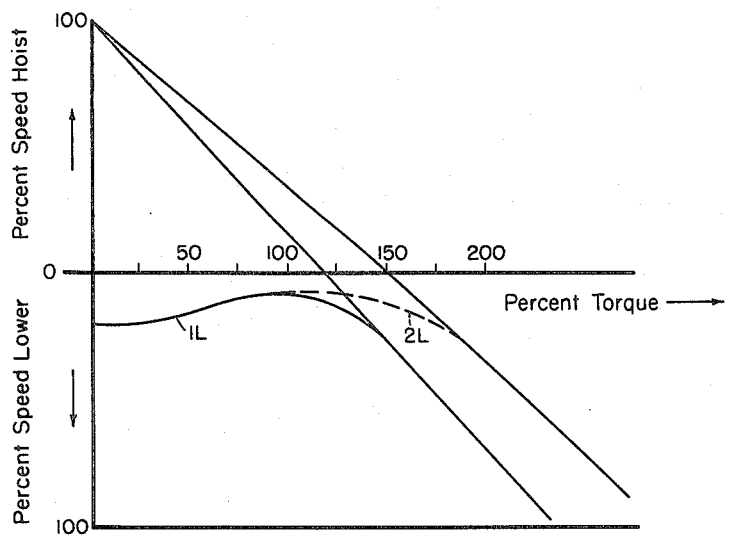
Figure 5:
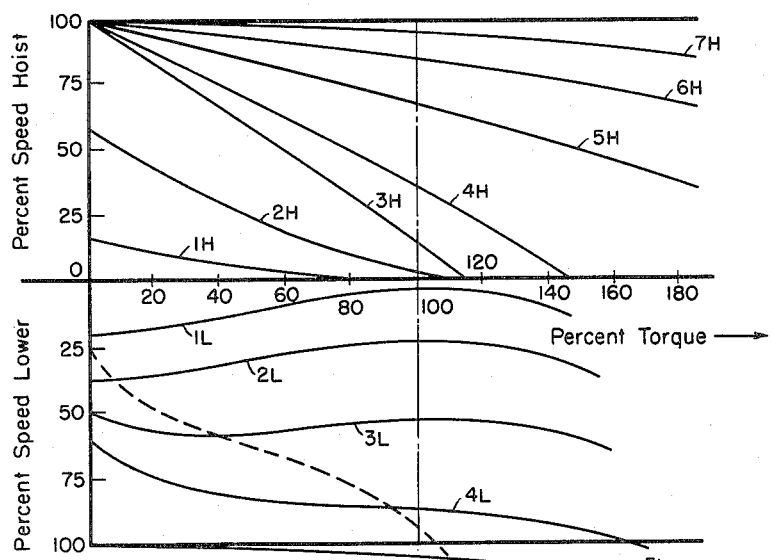
Figure 6:
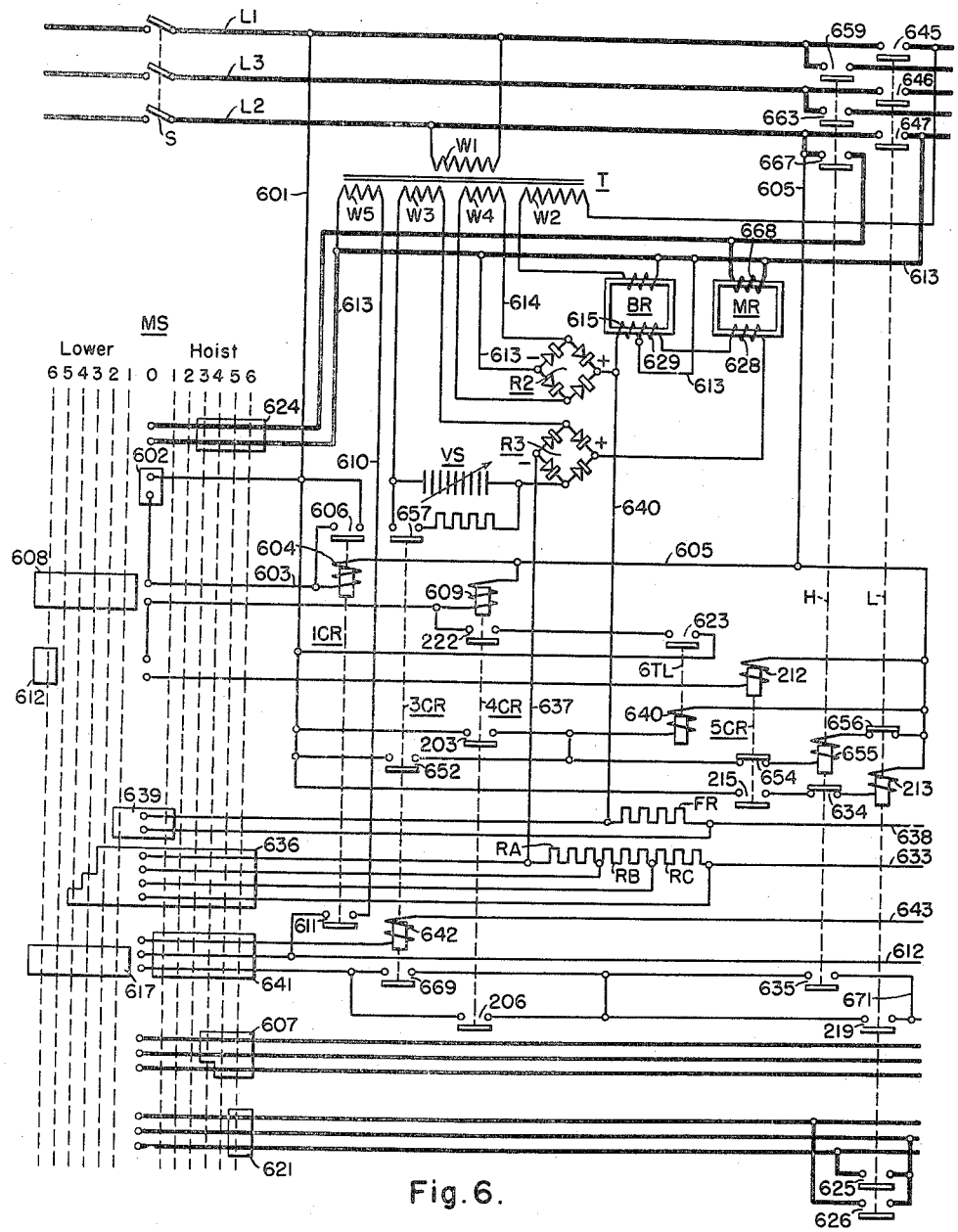
Figure 6A:
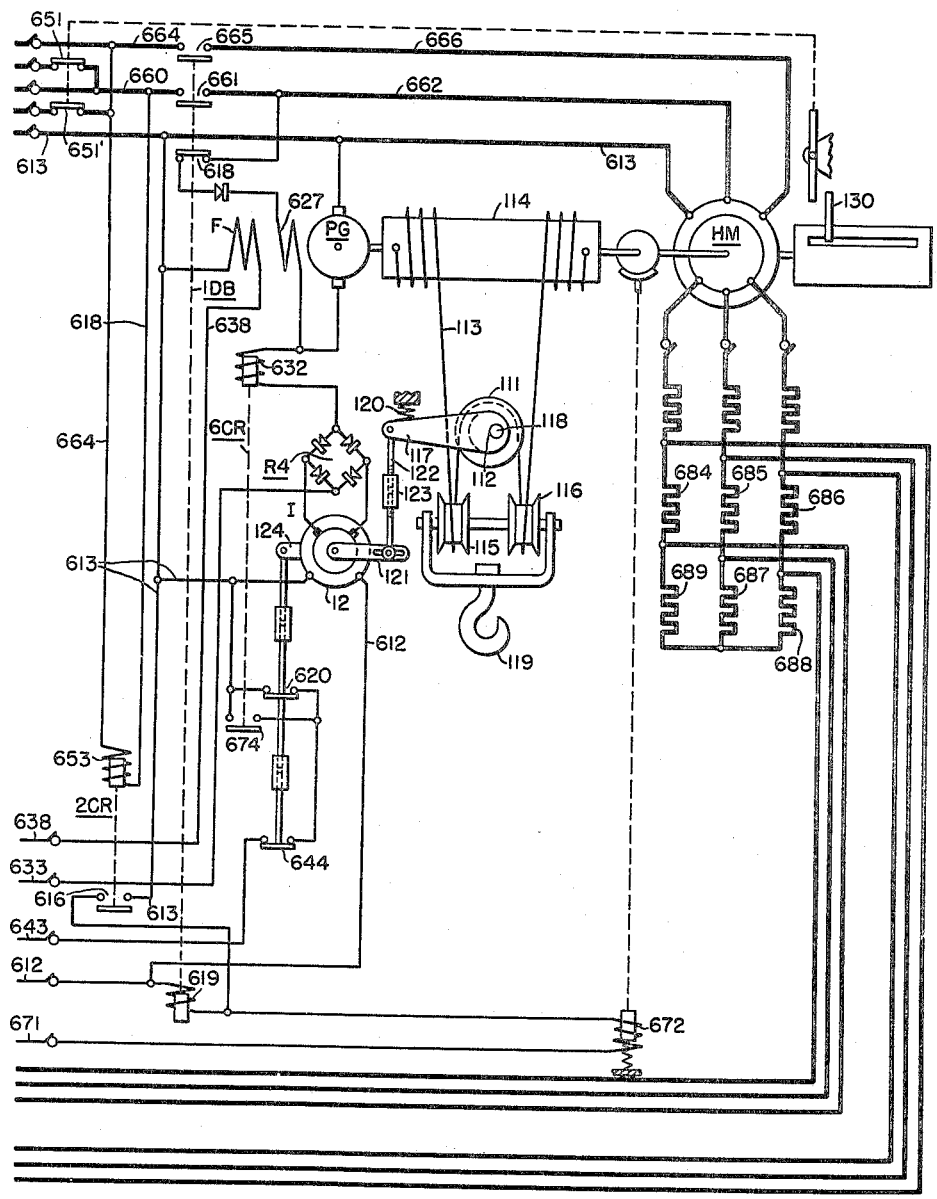

Figs. 3, 3a, 4, and 5 show families of curves, namely, speed-torque characteristic curves obtained by a hoist control system built in accordance with my invention; and Figs. 6 and 6a show a diagrammatic view of a modification of my invention.

Figure 1:
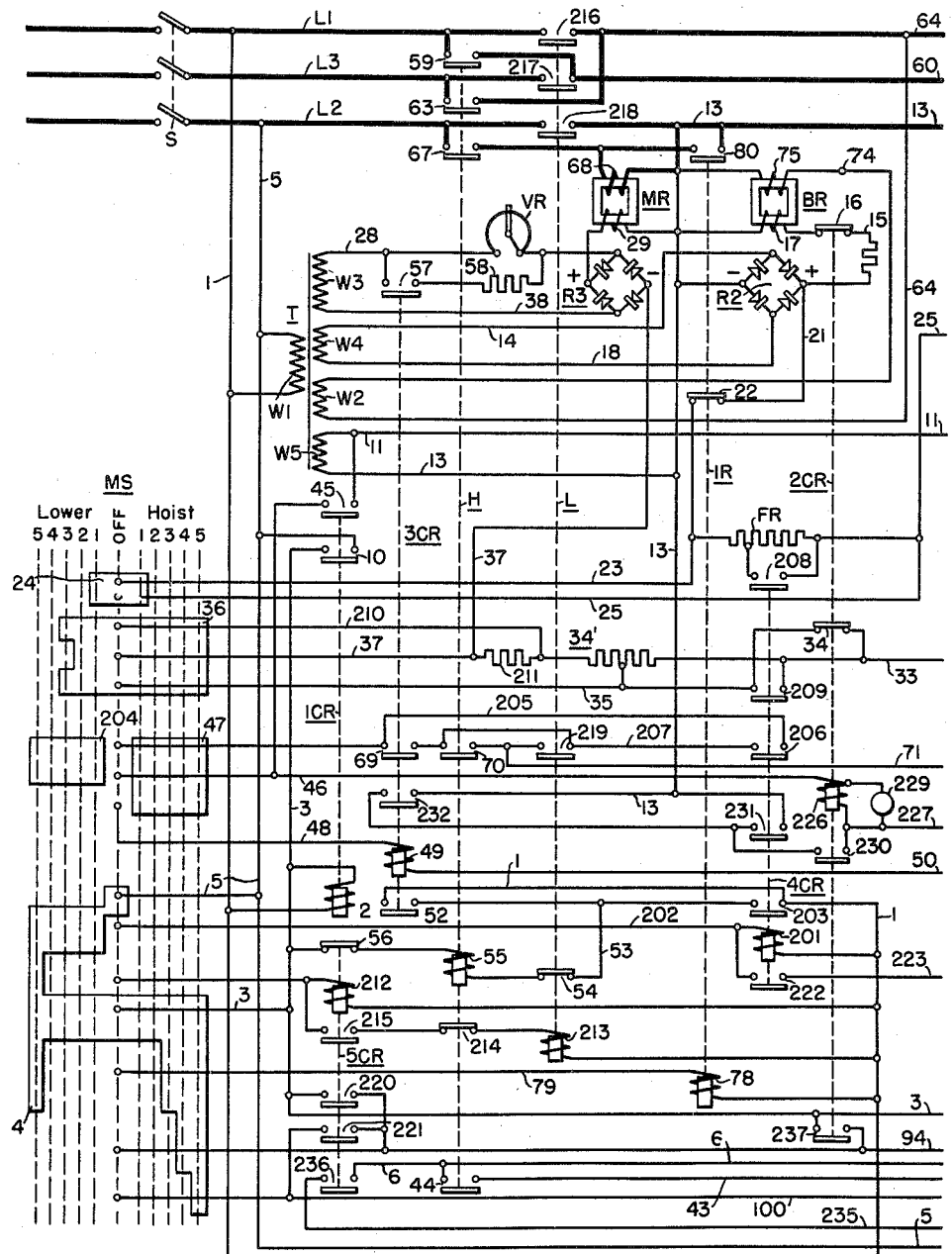
Figures 1 and 1a are a diagrammatic showing of a motor control system embodying my invention.
Figure 1A:
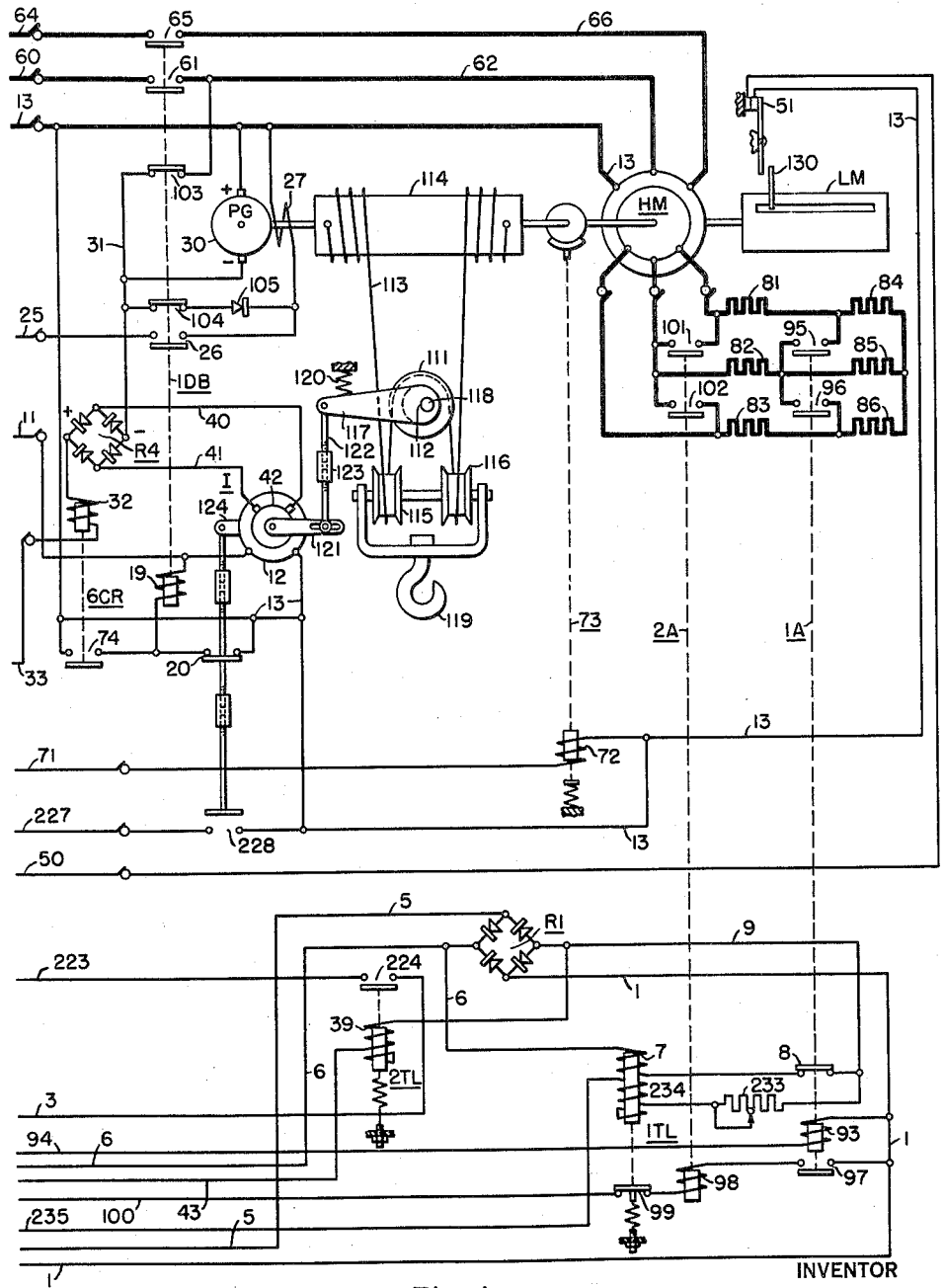

In Figs. 1 and 1a, HM represents the hoist motor for driving the hoist drum 114, the pilot generator PG, and the limit switch mechanism LM. The mechanism LM has the traveling dog 130 for operating the limit switch 51 when the hook 119 is at its upper limit of travel. The motor HM is of the three-phase type and is connected to be supplied from a duplex interconnected three-phase system including conductors L1, L2, L3 and conductor 74. The motor is controlled by varying the phase unbalance of the power supplied to it.

The host drum 114, as is the case for all cranes in general use, is designed to handle two cable ends with the loop portion traversing the hook sheaves 115 and 116 and an equalizer sheave 111 disposed between the hook sheaves.

The pilot generator PG selected is not merely a tachometer for measuring the speed of the hoist drum, but the pilot generator is selected as a fairly sizable exciter with reference to the hoist motor and having a voltage output proportional to speed. By selecting a pilot generator somewhat larger than would normally be necessary if a speed signal only were needed, I am able to use the pilot generator for dynamic braking purposes during stopping, and use the voltage output during running for altering the phase unbalance of the hoist motor.

The phase unbalance on the motor HM is produced by the combined action of the main reactor MR and the biasing reactor BR.

Figure 2:
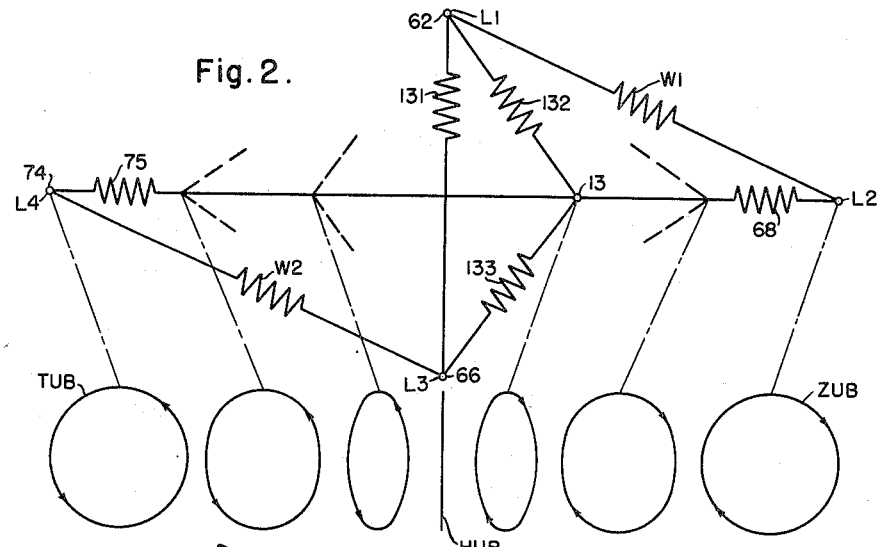
Fig. 2 is a diagrammatic showing of some of the basic circuits of my invention.

To understand the functions of the reactors, reference should be had to Fig. 2. The motor primary windings 131, 132, and 133 are shown as connected in delta with the alternating-current supply lead L1 connected to the motor terminal 62, and the alternating-current supply terminal L3 connected to motor terminal 66. The motor terminal 13 is connected to the supply conductor L2 through the alternating-current winding 68 of the main reactor MR. The primary winding W1 of the phase-shifting transformer T is connected across supply leads L1 and L2. The alternating-current winding 75 of the bias reactor BR is connected across conductor 74 and the motor terminal 13, and the secondary winding W2 of the phase-shifting transformer T is connected across motor terminal 66 and conductor 74.

If the reactance of winding 68 is at a zero value and the reactance of winding 75 is high it is apparent that the motor terminals 62, 13, and 66 will be in effect connected directly to the supply leads L1, L2 and L3. Under these conditions the motor energization may be considered as fully balanced. The phase rotation will be as indicated by circle ZUB.

If the reactance of winding 75 is reduced to zero and a high reactance is assumed for winding 68, it is apparent that conductor 74 will in effect correspond to a fourth phase with the armature terminal 13 shifted in phase so as to be connected directly to conductor 74. Under this condition the phase rotation will be as indicated by circle TUB and the unbalance, with reference to the balanced condition above mentioned, may be considered as a 200% unbalance. Fig. 2 shows graphically the unbalance which may be produced with the duplex interconnected three-phase source, having terminals L1, L2, L3 and 74. In Fig. 2 the opposite phase terminals are L1 and L3, and L2 and 74, respectively.

By proper selection of the resistance value of resistor 15 and the voltage changes taking place in the circuit including winding 17 to alter the excitation of winding 17 to thus change the reactance of winding 75, the maximum unbalance possible may be adjusted, for example, to be 120% when the reactance of winding 68 is at the maximum reactance value it is to have for the required operating characteristics selected.

The horizontal shifting of motor terminal 13 is, of course, also a function of the reactance of winding 68. By changing the excitation of the direct-current winding 29 from its selected minimum, which may be zero to higher values, the unbalance may be changed from 120% to zero unbalance, at which zero unbalance armature terminal 13 may be considered as connected directly to supply lead L2.

The phase rotation will be as indicated by circle ZUB representing zero unbalance. At 100% unbalance, represented by the line HUB, there is, of course, no torque. By providing a fine adjustment of the excitation current in winding 29 as by the vernier VR, the electric position of terminal 13 with reference to conductor 74 and supply lead L2 may be made in micrometric steps.

To get the valuable characteristics from my system of control for a hoist application, I make the excitation of winding 29 a function of the setting of control apparatus which includes the adjustment of the biasing reactor BR, a function of the hoisting speed, and a function of the load on the hoist hook.

A still better understanding of my invention may be had from a study of the operating functions thereof for the various work conditions encountered in practice.

When operation of the apparatus is to be effected, the switch C is closed to connect the energized supply buses shown to the leads L1, L2 and L3.

An energized circuit is thus established from lead L1 through conductor 1, actuating coil 2 of the control relay 1CR, conductor 3 to the controller segment 4 of the master controller MS, and conductor 5 to the lead L2. A second circuit is established from conductor 1 through the primary winding W1 of the phase-shifting transformer T to conductor 5. The transformer secondaries W2, W3, W4 and W5 will thus be energized to have an output voltage at their terminals.

A third circuit is established from conductor 1 through the full-wave rectifier R1 (see Fig. 1a), conductor 6, the magnetizing winding 7 of the inductive time limit relay 1TL, the normally closed contacts 8 of the accelerating contactor 1A, conductor 9, through the rectifier R1 to conductor 5. Operation of the relay 1CR effects the closing of contacts 10. Relay 1CR is thus held in by its own contacts 10. Operation of the master controller from the off position, therefore, does not affect the operation of relay 1CR.

The energization of transformer secondary W5 establishes an energizing circuit from its upper terminal, through conductor 11, through the primary winding 12 of the inductor I and conductor 13 to the lower terminal of the secondary W5.

One of the valuable contributions made to the art by my invention is the use of the inductor and the elements that control its function and the elements that are controlled by its output. The function of the inductor is unusual, but the device itself is the widely used repulsion-induction motor so designed that its rotor output is sensitive to the position of the rotor with reference to the stator.

All cranes in general use at present have a rope, or cable, system-equalizer sheave, namely, the sheave 111 shown in Figs. 1a and 6a. This sheave is rotatably mounted on suitable roller bearings, on an axis 112 fixed on the crane frame. The cable 113 coming from one section of the hoist drum 114 traverses the hook sheave 115, thence passes over the equalizer sheave 111, over the second hook sheave 116, back to the second portion of the hoist drum.

The crank arm 117 has its hub end rotatably mounted in suitable roller bearings within the sheave 111, but its axis 118 is a short distance to the left of the axis 112 of sheave 111. The result is that any load on the hook 119 will cause crank arm 117 to rotate in a clockwise direction against the spring 120 by an amount that is a measure of the load on the hook.

The crank arm 117 is coupled to the crank arm 121, connected to the rotor of the inductor I by the link 122 including the turnbuckle 123. With no load on the hook, the turnbuckle 123 is adjusted so that the output at the terminals 40 and 41 of the inductor I is zero; that is, the input to rectifier R4 at the alternating-current terminals is zero. It will be noted that the effective length of the crank arm 121 is also made adjustable. The adjustment of the effective crank arm length is so made that with full load on the hook and the master controller MS in the first point, lowering an output on terminals 40 and 42 is produced to effect a suitable lowering speed of the load. This will become more apparent from the discussion of the lowering operations made hereinafter.

A second crank arm 124 is also coupled to the rotor of the inductor I for actuation of the contacts 20 and 228. The contacts 20 are actuated through the adjustable links shown; and in normal operation the adjustment is such that the contacts 20 open shortly after the contacts 74 of the control relay 6CR close and the load builds up and contacts 228 close when the load on the hook is above the rated load.

A further energized circuit is established by the closing of switch S. This circuit may be traced from the upper terminal of the secondary W4 through the conductor 14, the full-wave rectifier R2, resistor 15, the back contacts 16 of the control relay 2CR, the direct-current winding 17 of the biasing reactor BR, conductor 13, the full-wave rectifier R2, and conductor 18 to the lower terminal of the secondary W4.

Another circuit may be traced from conductor 11 through the actuating coil 19 of the dynamic braking contactor 1DB, contacts 20 to the energized conductor 13. Operation of the contactor 1DB effects the opening of contacts 103 and 104 and the closing of contacts 26, 61, and 65. The opening of contacts 104 opens the self-exciting circuit for the field winding of the pilot generator PG.

The closing of contacts 26 establishes a circuit from the positive terminal of rectifier R2 through conductor 21, contacts 22 of contactor 1R, conductor 23, controller segment 24, conductor 25, contacts 26, field winding 27 to the conductor 13, also comprising one of the motor terminals, to the negative terminal of the rectifier R2. From the circuit traced, it is apparent that field winding 27 is heavily excited, thus assuring a maximum voltage output from the pilot generator when it is operated.

A circuit is established from the upper terminal of the secondary W3 through conductor 28, vernier resistor VR, the rectifier R3, the direct-current winding 29 of the main reactor MR, conductor 13, the armature 30 of the pilot generator PG, conductor 31, the rectifier R4, actuating coil 32 of the control relay 6CR, conductor 33, back contacts 34 of control relay 2CR, conductor 35, controller segment 36, conductor 37, and rectifier R3 to the conductor 38 connected to the lower terminal of secondary W3. It will be noted that the output terminals 40 and 41 of the secondary winding 42 of the inductor I are connected to the alternating-current terminals of rectifier R4. From these circuits just traced, it is thus apparent that the excitation of winding 29 is a function of the outputs of the rectifiers R3 and R4 and of the pilot generator PG, that is, a function of the setting of the vernier resistor VR, the output voltage of the inductor I, and the output of the pilot generator PG.

The operation of contactor 6CR effects the closing of contacts 474. The energization of the dynamic braking contactor 1DB is thus made independent of the position of the contacts 20, which contacts 20 open shortly after contacts 474 close; that is, contacts 20 open as soon as there is some compression of spring 120 by reason of some loading on the sheave 111. Contacts 20 may be adjusted to close for loads as light as the chains on the otherwise empty hook.

When the master controller MS is moved to the first point hoist, a circuit is established from conductor 11 through the contacts 45, conductor 46, controller segment 47, conductor 48, actuating coil 49 of the control relay 3CR, conductor 50, limit switch 51, and conductor 13 to the lower terminal of secondary W5.

Operation of the control relay 3CR effects the closing of contacts 52, 57, 69, and 232. The closing of contacts 52 establishes a circuit from conductor 1 through contacts 52, conductor 53, back contacts 54 of the lowering directional contactor L, actuating coil 55 of the hoisting directional contactor H, contacts 56 of the control relay 5CR, conductor 3 and contacts 10 to conductor 5. The closing of contacts 57 connects the resistor 58, having a relatively low resistance value, in parallel to the vernier resistor VR. The result is that secondary W3 produces its maximum effect on the circuit including the winding 29. The closing of the contacts 69 and 232 does not at this time effect any operation.

The operation of the hoist contactor H effects the opening of the electric interlock contacts 214, and the closing of contacts 44, 59, 63, 67 and 70.

The closing of contacts 44 establishes a circuit from the energized conductor 9 through the actuating coil 39 of the time limit relay 2TL, conductor 43 contacts 44, to the energized conductor 6. The operation of the time limit relay 2TL does not as yet produce its useful effect.

The closing of contacts 59 establishes a circuit from lead L1 through contacts 59, conductor 60, and contacts 61 to one motor terminal 62. The closing of contacts 63 establishes a circuit from lead L3 through contacts 63, conductor 64, contacts 65 to a second motor terminal 66, and the closing of contacts 67 establishes a circuit from lead L2 through contacts 67, and the alternating-current winding 68 of the main reactor MR to the third motor terminal 13.

The closing of contacts 70 establishes a circuit from the energized controller segment 47 through contacts 69 and 70, conductor 71, brake coil 72 of the brake 73 to the energized conductor 13. The break is thus released so that the hoist motor HM may now operate the hook in the hoist direction.

Figure 3A:
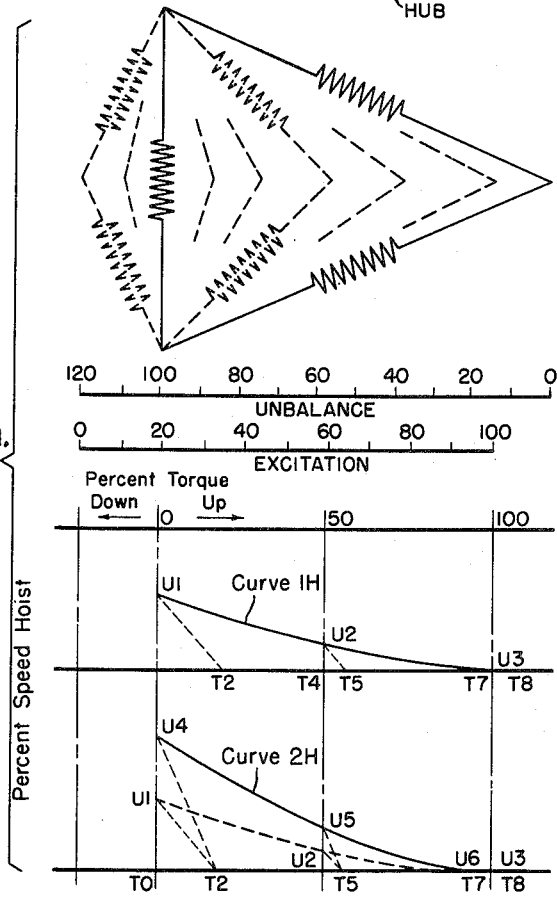

The selection of resistor 58 is such that with no load on the hook 119 and the controller still in the first hoist position now being considered, a voltage output is produced at the direct-current terminals of the rectifier R3 that the winding 29 unbalances the motor about 85%, where the motor produces a hoisting torque T2, as shown in Fig. 3a, and is unopposed by a load. This also means that the inductor I produces no effect on winding 29. The motor now accelerates in the hoisting direction, and the pilot generator PG, being heavily excited, generates a relatively high voltage, which voltage acts in opposition to the voltage of the rectifier R3. With increase in speed, the excitation of winding 29 decreases until the unbalance is 100%, the torque disappears and the motor runs at speed U1.

As more and more load is added, the torque again appears as, for example, the torques T4, T5, T7, and T8. At torque T5 the effect of the inductor I, namely, the output of rectifier R4 and the output of rectifier R3, is such at zero speed that the unbalance is at about 55%. The full speed is thus U2, the torque T4, the unbalance about 58% and the load 50% of full load.

At torque T8 for zero speed, the effect is such that the motor speed is almost zero. At this very low speed represented by a full-speed torque of T7, the hook and chains are thus very gently applied to the load. From the curve 1H shown both in Figs. 3a and 5, it is apparent that even an empty hook is accelerated very slowly, and at its full speed for the first point hoist, the speed is only about 17% of the normal motor speed. This is a very valuable contribution to the art.

When the master controller is moved to the second point hoist, the shunting circuit, comprising the conductor 23, controller segment 24 and conductor 25, for the field resistor FR is opened. The excitation of the pilot generator is thus very materially reduced.

The zero speed torque at no load will thus again be T2 and the zero-speed motor unbalance will be at 85% but as the pilot generator speed increases, its opposing effect is much less and as a result the speed rises to U4. At half load the speed will be U5, and at full load the speed is U6, which speed is not much greater than speed U3. From Figs. 3a and 5, it will be apparent that the speed torque curve 2H has a very desirable shape. At full load the hook speed is very low, thus allowing a very gentle start of the load.

Movement of the master controller to the third point hoist establishes a circuit from conductor 1 through the actuating coil 78 of the main reactor-eliminating contactor 1R, conductor 79, to the energized controller segment 4. The operation of contactor 1R opens the field excitation circuit for the field 27 of the pilot generator PG and closes the contacts 80. Contacts 67 and 80 thus shunt the coil 68. The motor terminal 13 is thus connected directly to the lead L2 and is not affected by the setting of reactor BR. The unbalance disappears entirely and the motor torque and speed are determined entirely by the resistance in circuit with the secondary winding of the induction motor. Since all of the resistor sections as 81, 82, 83, etc., are in the secondary circuit, the speed torque curve 3H will be as indicated in Fig. 5.

For the fourth hoist position of the master controller, an energized circuit is established from energized conductor 1 through the actuating coil 93 of the accelerating contactor 1A, and conductor 94 to the energized controller segment 4. The operation of contactor 1A by the closing of contacts 95 and 96 eliminates the resistor sections 84, 85 and 86 from the motor secondary. The speed torque curve 4H is thus as shown in Fig. 5.

The operation of the accelerating contactor 1A also effects the opening of contacts 8 to thus open the circuit for the magnetizing winding 7 of the time limit relay 1TL. After the lapse of a selected time interval, contacts 99 are closed, whereupon a circuit is established from conductor 1 through contacts 97, coil 98 of the accelerating contactor 2A, contacts 99 and conductor 100, to the energized controller segment 4. The contactor 2A, by the closing of contacts 101 and 102, eliminates the resistor sections 81, 82 and 83 to further accelerate the hoist motor HM. The speed torque curve 5H shows the operating characteristics for this controller position.

In an actual application made of my invention, the secondary winding actually included six additional resistor sections, which might be designated resistor sections 87, 88 and 89 and 90, 91 and 93 (not shown). This application required two additional accelerating contactors and the necessary time limit relays so that speed torque curves, such as shown by 6H and 7H, were produced.

When the hoisting is to be stopped, the master controller may be moved either to the neutral position or plugged to some one of the lowering positions.

If the controller is moved to the neutral position, many of the circuits heretofore discussed are deenergized. A detailed analysis is not necessary for those skilled in the art, but it is to be noted that 3CR is deenergized, which effects the deenergization of contactor H to disconnect the motor HM from the alternating-current buses and the dynamic braking contactor 1DB is deenergized. The contactor 1DB is deenergized because 6CR is deenergized by the opening of contacts 57 and thus opens its contacts 74. Contacts 20 are open at this stage.

The deenergization of the dynamic braking contactor 1DB opens contacts 26, 61 and 65 and closes contacts 103 and 104. The pilot generator is thus connected to the motor terminals 13 and 62 to effect dynamic braking.

At the same instant the dynamic braking circuit is established, the brake 73 sets to bring the load to a stop.

Upon power failure on the alternating-current buses, the conditions are the same for stopping as if the controller had been moved to the neutral position, except that 1CR drops out, making it necessary to move the controller to the neutral position before power can be applied to the motor. The rectifier 105 prevents deenergization of the field winding 27 in case power fails during hoisting when the pilot generator has its upper terminal positive.

The lowering operation is effected by moving the master controller to the first point lowering. With the controller in the first point lowering, a circuit is established from the conductor 1 through the actuating coil 201 of the control relay 4CR through conductor 202 to the energized controller segment 4.

The operation of relay 4CR closes the contacts 203, 206, 208, 209, 222, and 231. A circuit is thus established from conductor 1 through contacts 203, conductor 53, contacts 54, actuating coil 55 of the hoist directional contactor H and contacts 56 to the energized conductor 3.

Operation of contactor H applies power to leads 60 and 64 through contacts 59 and 63, and supplies power to motor terminal 13 through contacts 67 and the winding 68 of the main reactor MR.

It should be remembered that the dynamic braking contactor is energized and that relay 6CR is energized during this stage of operation. This means the field 27 of the pilot generator PG is heavily energized, since the field resistor FR is shunted by segment 24, and that applying power to leads 60 and 64 applies power to the motor terminals 62 and 66 through the contacts 61 and 65.

The operation of H also establishes a circuit from the energized conductor 46 through controller segment 204, conductor 205, contacts 206, conductor 207, contacts 70, conductor 71 and the brake coil 72 to the conductor, or motor terminal, 13. The brake is thus released.

Figure 3:
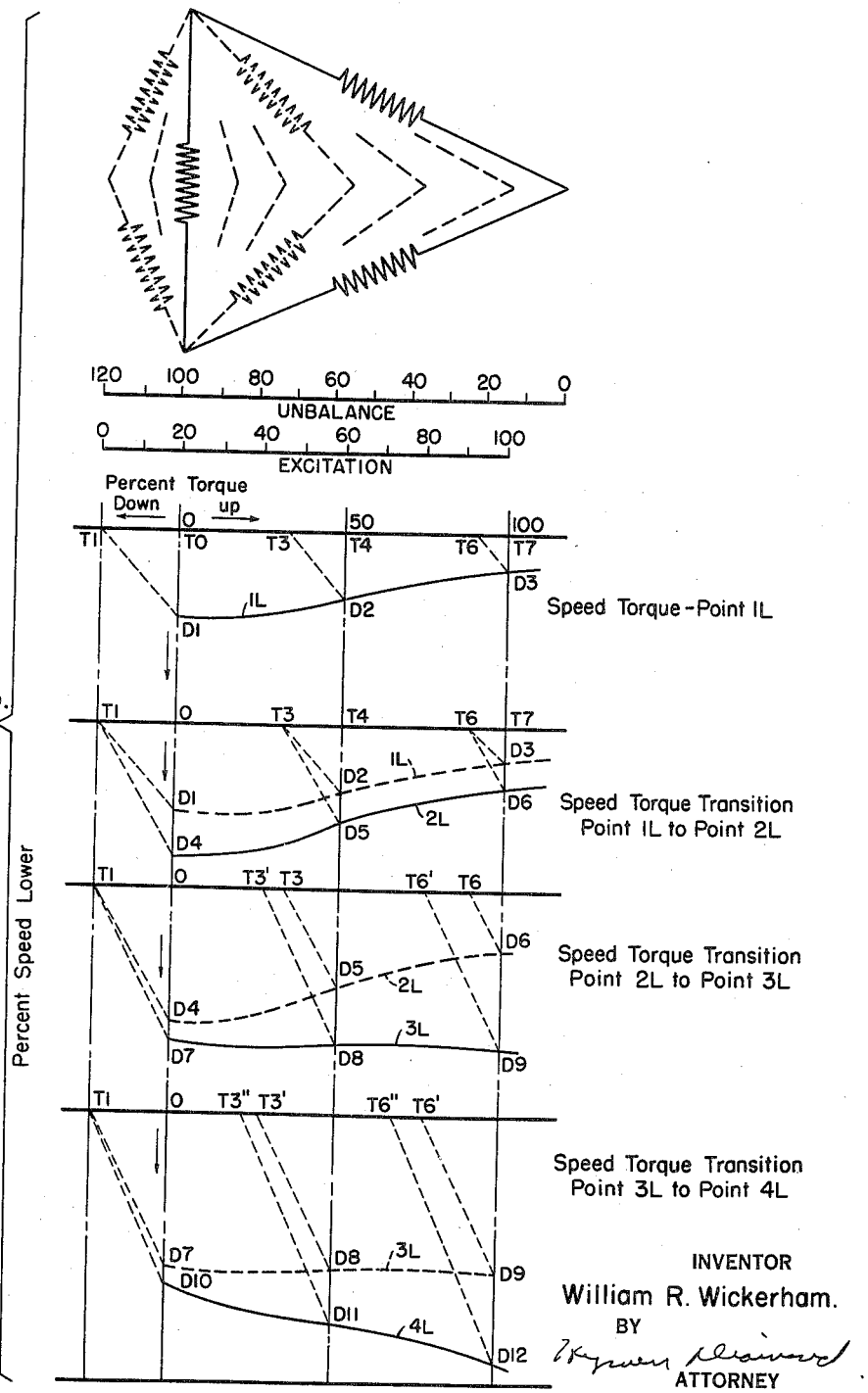

If there is no load on the hook, the driving down torque will be T1, see Fig. 3, but if there is a load on the hook, the torque will be some other value as for example T3 or T6.

With no load on the hook 119 and the hoist motor at rest with power applied, as above pointed out, the unbalance will be 120% and the motor lowering torque will be T1. The motor will then accelerate in the lowering direction accompanied by increase of excitation and a decrease in unbalance. When the motor speed reaches speed D1, the unbalance has been reduced to 100% and the torque is T0, nearly, zero. The motor thus does not change its speed. The main reactor excitation for this no-load condition originates entirely in the pilot generator. The polarity of the pilot generator will be opposite to the polarities shown.

If there be a 50% of full load on the hook 119 and the motor HM is at standstill, the load inductor will excite the main reactor to about 45% of normal. This reduces the unbalance to about 72% and causes the motor to produce torque T3. The torque T3 is less than torque T4 which is the torque the load is exerting on the hoist drum 114. The motor HM is thus overhauled and accelerates in the lowering direction. The speed of the pilot generator thus increases and as a result, exciting current is added to winding 29 to that already produced by the inductor I. The unbalance is thus decreased to 57%, corresponding to speed D2. At this speed the motor torque balances the load torque T4, and there is no further acceleration.

With full load on the hook, the output of the load inductor rises. This rise in output of the inductor raises the excitation of winding 29 to 92% of full value which reduces the unbalance to such an extent that there is only a 24% unbalance, and at which unbalance the motor can develop torque T6. Since this torque is less than the torque T7 being exerted by the load on the hoist drum 114, the motor is overhauled to speed D3, at which speed the effect of the pilot generator is to further decrease the unbalance. At speed D3, the motor torque balances torque T7 and no further increase in the overhauling speed takes place. The curve 1L drawn through speed points D1, D2, D3 is the lowering speed locus characteristic such as would be developed with changes of load in the first point lowering of the master controller.

When the master controller is moved to the second point lowering the field winding 27 of the pilot generator, PG is weakened because the segment 24 opens the circuit for the field resistor shunting leads 23 and 25. The circuit for field 27 may now be traced from the energized conductor 21, contacts 22, a few sections of the field resistor FR, contacts 208, conductor 25, contacts 26, and field 27 to the energized conductor 13.

Since the field 27 is weakened, the effect of the pilot generator on winding 29 is decreased and a greater speed is necessary to again produce a stable excitation. For the no-load, half-load, and full-load conditions, speeds D4, D5 and D6 are necessary. The second speed-load locus, represented by curve 2L, will have the same general slope as curve 1L, because the speed signal of the pilot generator is about equally effective for all speeds.

For the third lowering position, conductor 37 is disconnected from the controller segment 36. The excitation circuit for winding 29 now includes resistor 211. The circuit for this change may be traced from energized conductor 33, through contacts 209, conductor 35, controller segment 36, conductor 210, and resistor 211 to the energized conductor 37. In this connection it might be noted that for the lowering operations, when 4CR is energized, the contacts 209 are closed to shunt a section of resistor 34', thus reducing the resistance of the excitation circuit for winding 29 during the lowering operation and thus making that circuit more effective.

Since the insertion of resistor 211 in the excitation circuit for winding 29 weakens the effect of both the pilot generator and the inductor, the speeds required for no-load, half-load, and full-load change to D7, D8 and D9, respectively. The speed-load curve 3L represents this operation.

For the fourth lowering position of the controller conductor 35 is disconnected from the segment 36 and in consequence the resistance of the exciting circuit for winding 29 is further increased by the insertion of certain sections of resistor 34'.

The weakened load signal for the third and fourth positions has the effect of causing torque T3 and torque T6 to recede from torque T4 and torque T7, respectively, to the new torque positions T3' and T3'' and T6' and T6'', so that for the higher loads the speed signal must be proportionately greater and hence the speed higher.

The speed load curves for the third and fourth lowering positions are represented by the curves 3L and 4L, respectively, shown in Figs. 3 and 5.

When the controller is moved to the fifth lowering position, a circuit is established from conductor 1 through the actuating coil 212 of the control relay 5CR to the energized controller segment 4. Operation of relay 5CR closes contacts 215, 220, 221 and 236, and opens the contacts 56. The opening of contacts 56 interrupts the circuit for the coil 55 of the hoist directional contactor H. The hoist contactor thus closes contacts 214, establishing a circuit from conductor 1 through actuating coil 213 of the lowering directional contactor L, the contacts 214 and 215 to the energized controller segment 4.

When control relay 5CR is operated, contacts 236 are closed. This operation establishes a circuit from conductor 9 through the adjusting resistor 233, the neutralizing winding 234, conductor 235, and contacts 236 to conductor 6. The drop-out operation of the time limit relay is thus speeded up.

The operation of contactor L closes the contacts 216, 217, 218, and 219 to connect the motor terminals 13, 62 and 66 to the alternating-current supply leads, and to now maintain the circuit for the brake coil 72 from energized conductor 207 through contacts 219, conductor 71, and brake coil 72 to the energized conductor 13.

Another circuit is established from conductor 1 through the actuating coil 93 of the accelerating contactor 1A, conductor 94 and contacts 220 to the energized conductor 3. Since the contactor 1A closes contaccts 97, the accelerating contactor 2A is also energized by a circuit from conductor 1 through contacts 97, coil 98, contacts 99, conductor 100, and contacts 221 and 220 to the conductor 3.

When control relay 4CR is operated, it closes a holding circuit for itself through contacts 222, conductor 223, contacts 224 of the time limit relay 2TL to the conductor 3. This holding circuit assures that relay 4CR remains energized for a definite time interval after the controller is moved to the off position or during power failure of the alternating-current supply.

A still further circuit is established from conductor 1 through coil 78 and conductor 79 to the controller segment 4. The field circuit 27 is thus opened at contacts 22 and the winding 68 is shunted out by contacts 80. The hoist motor thus runs at synchronous speed if there is no load on the hook or runs somewhat above synchronous speed if there is no load on the hook. With an overhauling load, power is returned to the line regeneratively.

If power fails or the controller is moved to the off position, the dynamic braking circuit is established and the brake sets.

If an attempt is made to lower or hoist a load greater than the rated load of the machine, the load sensitive device closes contacts 228, whereupon a circuit is established from an energized conductor 46 through the actuating coil 226 of control relay 2CR, conductor 227, and contacts 228 to the conductor 13. This circuit may include an alarm or lights as 229 to warn the attendant that the load is in excess of the capacity of the equipment. This safety circuit and alarm circuit is held in by the contacts 230 and 231 or 232, depending on whether an attempt is being made to lower an excessive load, or hoist an excessive load.

From the showing in Fig. 4, it is apparent that for full load on the crane hook and lesser loads, the motor rotor assistance will be such as to produce a speed-torque characteristic as evidenced by curve 1L. This curve represents the absolute limit of torque that the motor can produce with full load or less on the hook. The average current will be a trifle less than 125% normal for the heavier loads, and somewhat less for the lighter loads. To handle overloads, the operation of relay 2CR is effected by the closing of contacts 228. The operation of relay 2CR thus closes contacts 237 to effect the removal of the resistor sections 84, 85 and 86 by the energization of contactor 1A from conductor 94 through contacts 237 to conductor 3. Under this condition the curve 2L represents the ultimate torque obtainable. This condition is associated with higher exciting load currents in the neighborhood of 150%. To safeguard the equipment, the high exciting current can appear only while the master controller is not in the off position. In other words, when the controller is in the off position, relay 2CR cannot be energized to open the contacts 16.

When operation of the apparatus shown in Figs. 6 and 6a is to be effected, the switch S is closed to connect the energized supply buses to the leads L1, L2 and L3.

An energized circuit is thus established from conductor L1 through conductor 601, controller segment 602, conductor 603, actuating coil 604, of control relay 1CR, and conductor 605 to the lead L2. A second circuit energizes the primary winding W1 of the transformer T. The transformer secondary windings W2, W3, W4, and W5 will thus be energized to produce an output voltage at their terminals.

The operation of the relay 1CR effects the closing of contacts 606, thus making the operation of relay 1CR independent of the position of the controller segment 602, and effects the closing of contacts 611.

The energization of the secondary winding W5 thus establishes a circuit from right-hand terminal of W5 through the conductor 610, contacts 611, conductor 612, the primary winding 12 of the inductor I and conductor 613 to the left-hand terminal of secondary W5.

A further energizing circuit is established by the closing of switch S. This circuit may be traced from the right-hand terminal of secondary W4 through the conductor 614, the full-wave rectifier R2, conductor 613, the direct-current control winding 615 of the biasing reactor BR and the rectifier R2 back to the left-hand terminal of secondary W4.

A circuit is also established from the right-hand terminal of secondary W3 through rectifier R3, the direct-current control winding 628 of the main reactor MR, a second direct-current control coil 629 on the biasing reactor BR, conductor 613, the armature of the pilot generator PG, the actuating coil 632 of the control relay 6CR, the rectifier R4, conductor 633, controller segment 636, conducor 637, rectifier R3, the vernier carbon pile switch VS, to the left-hand terminal of secondary W3.

The operation of relay 6CR effects the closing of contacts 674. The energization of the primary of the inductor I is thus made independent of the position of contacts 620, which contacts open as soon as there is some compression of spring 120 by reason of some loading on the sheave 111. Since coil 632, in normal use of my invention, is always energized before the hoist motor HM is energized, it is apparent that contacts 674 always close before contacts 620 open.

A still further circuit is established from the positive terminal, conductor 613, of rectifier R2, through the field winding F of the pilot generator PG, conductor 638, controller segment 639, and conductor 640 to the negative terminal of the rectifier R2. From the foregoing discussion, it is apparent that the pilot generator will have rather strong field excitation in the off position of the master controller. This is of considerable advantage for dynamic braking purposes, as will become more apparent hereinafter.

When the master controller is moved to the first hoist position, a circuit is established from conductor 610, through contacts 611, controller segment 641, actuating coil 642 of the control relay 3CR, conductor 643, contacts 644 and 674, to the conductor 613.

The operation of relay 3CR effects the closing of contacts 657, 652, and 669. The closing of contacts 657 changes the output characteristic of the secondary W3. The effect of the closing of contacts 669 will become more apparent hereinafter. The closing of contacts 652 establishes a circuit from energized conductor 601 through contacts 652 and 654, actuating coil 655 of the hoist directional contactor H, contacts 656, to the energized conductor 605.

The operation of contactor H effects the opening of the electric interlock contacts 634 and the closing of contacts 635, 659, 663, and 667.

The closing of contacts 659 and 663 establishes a circuit from conductor L1 through contacts 659, the upper limit switch contacts 651, conductor 660, actuating coil 653 of the relay 2CR, conductor 664, the lower limit switch 651', and contacts 663 to conductor L3.

The closing of contacts 667 connects conductor L2 to the hoist motor primary terminal represented by conductor 613. This circuit may be traced from conductor L2 through contacts 667, the alternating-current winding 668 of the main reactor MR, to conductor 613.

The operation of relay 2CR effects the closing of contacts 616, whereupon a circuit is established from the energized conductor 612, through actuating coil 619 of the dynamic braking contactor 1DB, contacts 616, to the energized conductor 613. Another circuit is established from the energized controller segment 641 through contacts 669 and 635, conductor 671, the brake coil 672, and contacts 616 to the energized conductor 613. The brake is thus released. Since the dynamic braking contactor closes its contacts 661 and 665, the primary windings of the hoist motor, represented by terminals 613, 662, and 666, are connected to the supply. The hoist motor may thus operate to begin to hoist its load. It will be noted that the dynamic braking contactor, by the opening of the contacts 618 disconnects the armature of the pilot generator from the conductors 660 and 613.

When the master controller MS is moved to the second point hoist, the shunting circuit for the field resistor FR, comprising the controller segment 639, is opened. The excitation of the pilot generator is thus reduced. The purpose of this is apparent from the discussion of the operation of the embodiment shown in Figs. 1 and 1a.

Movement of the master controller to the third point hoist establishes a shunt circuit at controller segment 624, for the alternating-current winding 668 of the main reactor MR. The hoist motor thus operates as a conventional wound rotor induction motor. In the fourth controller position, the first group of resistor sections 687 and 688 is shunted at the controller segment 607, and in the fifth position, section 689 is also shunted. In the sixth position, resistor sections 684, 685 and 686 are shunted.

When the hoisting is to be stopped, the master controller is moved to the off position and many of the circuits heretofore discussed are deenergized. The hoist motor is thus disconnected from the supply, but since the dynamic braking contactor 1DB closes its contacts 618, the pilot generator PG has its armature connected to the hoist motor primary windings represented by the motor terminals 613 and 662. Since field F is heavily excited and the series field 627 acts cumulatively to the field F, it is apparent that the pilot generator produces a maximum braking effect. Of course, the brake also sets during the establishment of the dynamic braking circuit.

The lowering operation is effected by moving the master controller to the first point lowering. With the controller in the first point lowering, a circuit is established from the energized conductor 603 through the controller segment 608, actuating coil 609 of the control relay 4CR to the energized conductor 605.

The operation of relay 4CR effects the closing of contacts 203 to establish a circuit from conductor 601 through contacts 203, the actuating coil 640 of the time limit relay 6TL to the energized conductor 605. The time limit relay closes its contacts 623 and a holding circuit is thus established for the relay 4CR through the contacts 222 and 623.

A second circuit is also established by the closing of contacts 203, which circuit may be traced from conductor 601 through contacts 203 and 654, the actuating coil 655 of hoist contactor H, and contacts 656, to the energized conductor 605. The hoist contactor thus establishes all the circuits heretofore discussed for the first position hoist. That is, relay 2CR is operated, the dynamic braking contactor is operated, and the brake coil is energized. The circuit for the brake coil may be traced from the energized controller segment 617 through contacts 206 and 219, the brake coil 672, and contacts 616, to the energized conductor 613.

When the master controller is moved to the second position lowering the excitation of the pilot generator is decreased because the shunt for the field resistor FR is removed at the controller segment 639.

For the third point lowering the resistor section RA is inserted in the control circuit including the inductor, the pilot generator, and the main reactor. For the fourth lowering position, resistance section RB is inserted in the control circuit, and for the fifth position, resistor section RC is inserted in the control circuit. Operating characteristics like those obtained by the embodiment of Figs. 1 and 1a are thus obtained with this manual control.

When the master controller is moved to the sixth position lowering, a circuit is established from the energized conductor 603, controller segments 608 and 612 and actuating coil 212 of the relay 5CR to the energized conductor 605.

The operation of relay 5CR effects the deenergization of the hoist contactor by the opening of the contacts 654 and the closing of contacts 215. The closing of contacts 215 and 634 effects the energization of the actuating coil 213 of the lowering directional contactor L.

The motor primary is thus connected for reverse rotation by the closure of contacts 645, 646, 647. The closure of contacts 219 maintains the brake coil energized despite the fact that contacts 635 open. Further, the operation of contactor L also effects the closing of contacts 625 and 626 to thus shunt the resistor sections 684 to 689, inclusive.

In addition to the many advantages provided by my control, I provide for vernier control during all points lowering. The vernier control is of special advantage during the first point lowering when the lowering speed is to be brought down to zero in very small increments, if desired, for very careful and gentle handling of a load. This is accomplished by merely slowly moving the vernier arm to increase the boosting current in the excitation circuit of the main reactor for the purpose of increasing the motor retarding torque. Because of the counteracting effects of the control windings 615 and 629 of the reactor BR the apparatus shown in Figs. 6–6A is highly sensitive. Rectifier R2 excites winding 615 so that the reactance of BR is low. Depending on the setting of VS and the resistor in shunt with it rectifier R3 excites winding 628 to reduce the impedance of MR and winding 629 to counteract the excitation of winding 615 and increase the impedance of BR. Thus any exciting current supplied by R3 has a "push-pull" effect. The load dependent current supplied by R4 and the speed dependent current supplied by PG has a similar push-pull effect. During hoisting for example the current supplied by PG reduces the effect of R3 increasing the impedance of MR and reducing the impedance of BR. This reduces the up torque. R4 increases the impedance of BR and decreases the impedance of MR increasing the up torque and reducing the tendency to overhaul.

While I have shown but two embodiments of my invention, it is understood that the invention is capable of various adaptations and that still other changes and modifications may be made or substitutions resorted to which come within the spirit of the invention.

I claim as my invention:

1. Apparatus for controlling the supply of power to a motor having first, second and third terminals from a three-phase supply having first, second and third phase conductors, comprising in combination a fourth conductor, means connecting said fourth conductor in a duplex interconnected three-phase source with said first, second and third conductors, said second and fourth and first and third conductors being at opposite-phase terminals of said source, a first inductor, a second inductor, each of said inductors having a control winding means and output winding means, means for connecting said first conductor to said first terminal, means for connecting said third conductor to said third terminal, means including said output winding means of said first inductor for connecting said second conductor to said second terminal, means including said output winding means of said second inductor for connecting said fourth conductor to said second terminal, biasing means connected to the control winding means of at least one of said inductors, and means connected to said control winding means of said inductors and to said motor so as to conduct current through both said control winding means simultaneously and responsive to an operative condition of said motor for varying the magnitudes of the impedance of both said inductors simultaneously, said motor responsive means conducting current through said control winding means of said one inductor opposing said biasing means and through said control winding means of said other inductor so as to decrease the impedance of said last-named inductor, whereby the magnitudes of the impedances of said first inductor is varied in opposite sense to the magnitude of the impedance of said second inductor for any setting of said motor responsive means.

2. Apparatus for controlling the supply of power to a motor having first, second and third terminals from a three-phase supply having first, second and third phase conductors, comprising in combination a fourth conductor, means connecting said fourth conductor in a duplex interconnected three-phase source with said first, second and third conductors, said second and fourth and first and third conductors being at opposite-phase terminals of said source, a first inductor, a second inductor, each of said inductors having control winding means and output winding means, biasing means connected to the control winding means of at least one of said inductors, means for connecting said first conductor to said first terminal, means for connecting said third conductor to said third terminal, means including said output winding means of said first inductor for connecting said second conductor to said second terminal, means including said output winding means of said second inductor for connecting said fourth conductor to said second terminal, and voltage producing means connected to said control winding means of said inductors so as to conduct current through said control winding means of both said inductors simultaneously and to said motor and responsive to the rotation of said motor for varying the magnitude of the impedance of both said inductors simultaneously for producing a voltage having a polarity dependent on the direction of rotation of said motor, said current opposing the bias of said biasing means connected to the control winding means of said one inductor and decreasing the impedance of said other inductor, whereby the magnitude of the impedance of said first inductor is varied in opposite sense to the magnitude of the impedance of said second inductor for any setting of said motor responsive means, and the magnitude of variation of each of said inductors depending on the direction of rotation of said motor, being greater for one direction of rotation of said motor than for the other.

3. Apparatus for controlling the supply of power from polyphase power-supply means to a polyphase motor comprising first reactor means, second reactor means, each reactor means having input-winding means and output-winding means, the impedance of each said output-winding means being dependent on the magnitude of the current through the corresponding input-winding means, biasing means connected to the input winding means of at least one of said reactor means to reduce the impedance of said one winding means, means connected to each said output-winding means for connecting both said output-winding means between said motor and said supply means so that said output-winding means unbalances the power supplied to said motor in dependence upon the impedance of each said output-winding means, variation of the impedance of one of said output-winding means in either sense producing an unbalance which is opposite to the unbalance produced by variation of the impedance of said other output-winding means in the same sense, control-current supply means for supplying current to control the impedance of said output-winding means, and means connecting in a series network said input-winding means of said first reactor means, said input-winding means of said second reactor means, and said control-current supply means, said control current counteracting the bias of said biasing means of said input-winding means of said one of said reactor means so that any change in the control current supplied by said control-current supply means produces a change in one sense in the impedance of the output-winding means of said one reactor means and a change in the opposite sense in the impedance of the output-winding means of said other reactor means.

4. In combination, first, second and third conductors constituting the phase conductors of a three-phase supply, a fourth conductor, means connecting said fourth conductor in a duplex interconnected three-phase source with said first, second and third conductors, said first and third and second and fourth conductors being at opposite-phase terminals of said source, a first inductor having an input winding, the magnitude of the control current flow through which determines the magnitude of the impedance of said first inductor, a second inductor, having an input winding, the magnitude of the control current flow through which determines the magnitude of the impedance of said second inductor, biasing means connected to at least one of said inductors to reduce the impedance of said one inductor, means for connecting in series said second conductor, said first inductor, said second inductor and said fourth conductor, control current supply means, and means connected to both said input windings and to said supply means for connecting said supply means to conduct current through both said input windings in series, the control current being so conducted as to counteract the biasing effect of said biasing means in said one inductor while decreasing the magnitude of the impedance of said other inductor thereby to produce simultaneously variations of opposite sense of the magnitude of the impedances of both said inductors.

References Cited in the file of this patent

UNITED STATES PATENTS

| | | |
|---|---|---|
| Re. 22,923 | Wickerham | Sept. 30, 1947 |
| 2,228,078 | Gulliksen | Jan. 7, 1941 |
| 2,299,911 | Logan | Oct. 27, 1942 |
| 2,384,864 | Wickerham | Sept. 18, 1945 |
| 2,408,461 | Wickerham | Oct. 1, 1946 |
| 2,440,319 | Wickerham | Apr. 27, 1948 |
| 2,550,569 | Lamm et al. | Apr. 24, 1951 |
| 2,712,105 | Mathias et al. | June 28, 1955 |
| 2,774,923 | Wickerham | Dec. 18, 1956 |